United States Patent [19]
Beuther et al.

[11] 3,708,550
[45] Jan. 2, 1973

[54] DEHYDROGENATION PROCESS

[75] Inventors: Harold Beuther; Harold E. Swift, both of Gibsonia, Pa.

[73] Assignee: Ameripol, Inc., Cleveland, Ohio

[22] Filed: June 16, 1971

[21] Appl. No.: 153,822

Related U.S. Application Data

[63] Continuation-in-part of Ser. No. 784,194, Dec. 16, 1968, abandoned.

[52] U.S. Cl..............................260/680 R, 260/680 E
[51] Int. Cl.................................................C07c 5/18
[58] Field of Search........................260/680 R, 680 E

[56] References Cited

UNITED STATES PATENTS

| | | | |
|---|---|---|---|
| 2,442,319 | 5/1948 | Britton et al. | 260/680 |
| 3,403,192 | 9/1968 | Vadekar et al. | 260/666 |
| 3,585,249 | 6/1971 | Cohen et al. | 260/680 |

*Primary Examiner*—Paul M. Coughlan, Jr.
*Attorney*—Robert W. Wilson et al.

[57] ABSTRACT

Process for reducing the formation and effects of carbon mounds in dehydrogenation reactions employing calcium nickel phosphate-containing catalysts by adding vaporized sulfur-containing materials to the catalyst bed. Such additives preferably are added during the hydrocarbon feed phase of the reaction cycle.

8 Claims, No Drawings

DEHYDROGENATION PROCESS

The present application is a continuation-in-part of our copending application, Ser. No. 784,194, filed Dec. 16, 1968, and now abandoned.

BACKGROUND OF THE INVENTION

1. Field of the Invention

This invention relates to an improved dehydrogenation process for converting olefins to diolefins. More particularly, this invention relates to a process for retarding the formation of carbon mounds in dehydrogenation catalyst beds and allowing restoration of maximum catalyst selectivity during regeneration cycles.

2. DESCRIPTION OF PRIOR ART

Certain calcium nickel phosphates and mixtures thereof with minor amounts of chromium oxide have heretofore been found to be highly effective in catalyzing the dehydrogenation of olefins having at least four carbon atoms in the unsaturated chain of the molecule at reaction temperatures not exceeding about 750°C. Because of their effectiveness and their selective action in catalyzing the dehydrogenation of olefins, such catalysts are suitable for the production of aliphatic conjugated diolefins such as butadiene, isoprene, piperylene, and the like, in high yields and readily purifiable form from olefinic starting materials. For example, such catalyst can be employed in producing both (1) 1,3-butadiene in good yield from 1-butene, 2-butene or mixtures thereof and (2) isoprene from isoamylene, if desired, employing olefin-containing feedstocks which contain a substantial amount of other hydrocarbons other than the olefin such as methane, ethane, propane, ethylene, butane, propylene and the like. The catalyst promotes dehydrogenation of the 1-butene and 2-butene to form 1,3-butadiene and/or of isoamylene to form isoprene, but does not appreciably catalyze decomposition of the other hydrocarbons.

The catalytically active calcium nickel phosphates contain from six to 12 and preferably 7.5 to 9.2 atoms of calcium per atom or nickel, the calcium and nickel being chemically combined with ortho-phosphate radicals. Such catalysts can be formed and precipitated by admixing in an aqueous medium, a water soluble ortho-phosphate, for example, phosphoric acid and an ammonium phosphate with nitrates or other water soluble salts of calcium and nickel in the proportions theoretically required to form such product, while maintaining the mixture in a neutral to alkaline condition. The precipitates are washed with water until substantially free of water soluble salts and dried. The resulting composition is usually pelletized as such or in admixture with about 30 percent by weight or less of chromic oxide so as to bring it to a form convenient for use as a catalyst.

On long-continued use of calcium nickel phosphate-containing catalysts for the production of conjugated diolefins on a commercial scale, the proportion of hydrogen and carbon oxides in the reactor effluent gases gradually increases through decomposition of the feed stream causing a resultant gradual decrease in the yield and ease of purification of the conjugated diolefin products. In addition to such decomposition of the feed stream, hard carbonaceous deposits called "carbon mounds" usually form in a most spontaneous and unpredictable manner within the catalyst body during use in the dehydrogenation of olefins.

A carbon mound is an area of the catalyst bed enclosed or cemented in a mass of carbon. Continued operation of the reactor containing a carbon mound can lead to a carbon growth extending above the bed and impeding vapor flow. In severe cases if such a mound is removed from the reactor before cooling occurs, the material of the mound will glow red in air.

Once carbon mounds are formed, the catalyst exhibits "wild" activity characterized by extensive and uncontrolled cracking and decomposition (combustion) of the feed stream. Considerable amounts of olefins in the feed are lost due to such decomposition and carbon mound formation and consequently, the efficiency of the process is significantly reduced. The earliest onset of carbon mound formation is easily detected by a carbon dioxide analysis of the gases leaving the bed.

Commercial users of the calcium/nickel phosphate type catalysts have become accustomed to shutdown a reactor which has developed a carbon mound, remove the catalyst from the reactor, screen out the carbon mound material and return the remainder of the charge to the reactor along with make-up catalyst, if needed. Such an operation is quite a laborious, time-consuming procedure very greatly increasing maintenance costs of the plant, very materially reducing plant output due to reactor down time and causing losses of an expensive catalyst. Sometimes a given lot of catalyst will be so "wild" in its behavior that it must be disposed of after only very short use. Catalyst life, therefore, has been most unpredictable. Catalyst life, expressed in terms of the number of pounds of butadiene produced per pound of catalyst during the entire effective catalyst life, has varied from as little as 50 to 100 lbs./lb. to, on very rare occasions, up to as much as 600 lbs./lb. In one large commercial plant, the average catalyst life over several years of operation prior to this invention has been about 300 lbs/lb. This makes catalyst costs much too high.

Accordingly, it is among the objects of this invention to provide an improved process for dehydrogenating olefins to form diolefins employing the calcium nickel phosphate catalysts. More specifically, it is an object of this invention to provide a process for treating calcium nickel phosphate containing catalysts to eliminate or suppress carbon mound formation and to reduce the effects of carbon mound formation and to reduce the effects of carbon mound formation on dehydrogenation efficiency and selectivity. Still another object of this invention is to provide an improved dehydrogenation process for dehydrogenating olefins to diolefins which will increase the effective life of calcium nickel phosphate containing catalysts and the efficiency and selectivity of such catalysts when dehydrogenating olefins to diolefins.

SUMMARY OF THE INVENTION

These, as well as other objects, are accomplished in accordance with the present invention which provides a very significantly improved process for dehydrogenating olefins to diolefins employing a reaction zone containing a calcium nickel phosphate catalyst, said improvement comprising feeding to the reaction zone from about 30 to about 300 parts/wt. per million parts/wt. of olefin (hereinafter referred to as "ppm") of a sulfur-containing material or compound characterized by the empirical formula:

$$(A)_m - S - (D)_n$$

wherein A is selected from the group consisting of a hydrogen atom, an oxygen atom, and alkyl and aryl hydrocarbon radicals containing from one to about 20 carbon atoms; D is selected from the class consisting of a hydrogen atom and alkyl and aryl hydrocarbon radicals containing from one to about 20 carbon atoms; and $m$ and $n$ are integers which can be the same or different and range from 1 to 2.

The olefins dehydrogenated by the method include any olefin containing at least four carbon atoms and which is convertible to a diolefin by removal of two atoms of hydrogen per molecule of olefin. Most preferably the olefins contain four to six carbon atoms such as n-butene and 2-butene, isoamylene (2-methyl butene-1), 2-ethyl butene-1, and others.

The proportion of the sulfur-containing material to be added to the reactor feed stream or streams within the above range has no significant deleterious effect on the catalyst. However, there is no advantage in employing more than about 250 ppm of the additive based on olefin. In fact, much lower amounts are fully effective. If the proportion of the sulfur-containing material is expressed by weight on the basis of the total weight of feed, it is much preferable to employ between about 4.5 ppm (equivalent to about 30 ppm based on the olefin) to about 50 ppm, more preferably between about 5 and about 25 ppm, of the material based on the total weight of feed consisting of olefin, steam, inerts, oxygen, etc. (these catalysts normally are employed with mixtures ranging from about 15 to about 20 volumes of steam for every one volume of the olefin hydrocarbon).

The above-recited proportions of the sulfur-containing additive are for total dehydrogenation feed conditions very low in sulfur content i.e. in the order of about 1 ppm by weight more or less of total sulfur). Such very low sulfur levels are inherent in the necessary mode of operation of a dehydrogenation plant. For example, crude Texas Gulf Coast feedstocks containing butenes and butadiene-1,3 are, when their butadiene content is sufficiently high to warrant extraction prior to use of the butenes in dehydrogenation, passed to the butadiene extraction units wherein the butadiene is selectively absorbed and the residual overheads containing butenes go on to the normal recycle/concentration systems wherein the butene-containing material is distilled and fractionated (for example to remove isobutylene) to form a recycle steam suitable for use in dehydrogenation. Such absorption step and the recycle preparation steps effectively remove nearly all the sulfur moieties in the original feedstock. Likewise, those crude feedstocks not subjected to the butadiene extraction step are passed through various acid washes, fractionation steps and caustic water washes to prepare a suitable butene-containing feedstream which usually is blended with normal recycle (obtained from the dehydro reactor effluents). In the latter case also, the hydrocarbon stream as fed to the reactors is also very low in sulfur moieties. In all of the above cases, the butene-containing material as actually fed to the reactor will contain between about 4 and about 8 ppm by weight of total sulfur. On a total feed basis (hydrocarbon and steam) the material fed to the reactor will contain only about 1 ppm (by wt.) more or less of total sulfur. Over the years, therefore, the sulfur content of the refinery streams employed as feedstocks in dehydrogenation does not appear to have been a factor affecting operation of the calcium nickel phosphate types of dehydrogenation catalysts.

DESCRIPTION OF THE INVENTION

The process for the production of conjugated diolefins by the dehydrogenation of olefins using calcium nickel phosphate-containing catalysts is known in the art and is described in such patents as U.S. Pat. Nos. 2,442,319; 2,442,320; 2,456,367 and 2,455,368. The reaction chamber is charged with the granular calcium nickel phosphate-containing catalyst which may include a minor amount of a lubricant such as graphite, vegetable oil, or a hydrocarbon oil, etc. used as a binder in forming pellets of the catalyst. Such lubricant, if present, is removed by passing air or preferably a mixture of about equal volumes of air and an inert diluent such as steam, nitrogen and the like through the catalyst bed at temperatures between about 450° and 750°C. When such lubricant is a material capable of being vaporized, for example, a mineral or vegetable oil, the step of treating the catalyst with air may be preceded by one of passing an inert gas such as steam, nitrogen, or carbon dioxide over the catalyst so as to vaporize and remove at least a portion of the binder from the catalyst granules. In instances in which the catalyst is obtained in a form free of lubricant or other organic impurities, the preliminary treating steps described hereinabove can be omitted.

When substantially free of carbon-containing impurities, the catalyst bed is swept free of air with an inert gas stream and is heated to the desired reaction temperature, preferably by passing superheated steam through the reaction chamber containing the catalyst. The olefin reactant, for example, butylenes, amylenes, hexenes, and the like or a mixture of an inert diluent and such olefin together with other paraffinic hydrocarbons or with olefinic hydrocarbons having the same or a lesser number of carbon atoms in the molecule as that possessed by the desired olefinic reactant, is passed through the reactor chamber and the catalyst bed therein, at reaction temperatures not exceeding about 750°C., for example, between about 450°C. and about 750°C., preferably between about 550°C. and about 750°C., and most preferably between about 600°C. and about 700°C. Generally the olefin is passed into admixture with steam which has been superheated to about 750°C. or above, i.e., to a temperature sufficient so that the resultant mixture is at the desired reaction temperature, and thereafter the mixture is passed through the reaction vessel containing the calcium nickel phosphate-containing catalyst. If desired, the heat required for the normally endothermic dehydrogenation reaction can be supplied in other ways, such as, by preheating the olefin stream and then combining the preheated olefin feed with superheated steam or by forming the steam and hydrocarbon mixture at a lower temperature and passing the mixture through a preheater to bring it to the desired temperature.

The yield of diolefin is usually highest when from about 15 to about 20 volumes of steam are employed per volume of the reactive olefin in the hydrocarbon starting material, but the steam or other inert diluent can be used in smaller or larger proportions, if desired.

In another modification of the calcium nickel phosphate dehydrogenation process such as is shown in U.S. Pat. No. 2,945,900, a small proportion of oxygen can be added along with the olefin and steam mixture. In this oxydehydrogenation version of the process, the concentration of oxygen in the feed can be from about 0.4 percent to about 2.9 percent/wt. based on total feed, i.e. between about 4,200 to about 29,000 parts/wt. of oxygen per million parts/wt. of total feed and the steam to olefin ratio is about 15:1 to 20:1. In this version, reaction temperature can vary from about 450°C. to about 700°F. The effect of the sulfur-containing material is even stronger in the oxidative dehydrogenation version of the process since the calcium-nickel phosphate catalyst in the presence of oxygen without the sulfur compound is even more "wild" than without oxygen and rapidly forms carbon mounds in just a few hours or days of operation. Example 6 of the examples below exemplifies this mode of operation.

The rate of vapor flow or space velocity (GHSV) through the catalyst chamber can be widely varied, but it usually corresponds to between about 50 and 700 liters of the olefins (expressed at 0°C and 760 milliliters absolute pressure) per liter of catalyst bed per hour.

The effluent vapor mixture is passed through heat exchangers and other cooling devices to condense the water and hydrocarbons therefrom. The hydrocarbon layer of the condensate is separated from the aqueous layer and fractionated in known manner, e.g. by distillation, to separate the diolefin product. Unconsumed olefin is concentrated by fractionation and recycled in the process and the relatively inert saturated hydrocarbons in the feed, if any, recovered for other uses.

During use in the dehydrogenation reaction, the catalyst gradually accumulates a small amount of carbon or non-volatile organic material and decreases in activity. Accordingly, flow of the hydrocarbon starting material is interrupted from time to time, gaseous hydrocarbons are swept from the catalyst bed with steam, and then air admixed with a equal volume or more (usually about six volumes) of superheated steam is passed through the catalyst bed, e.g. at temperatures between about 450°C. and about 700°C. and usually for from about 5½ to about 11 minutes, to oxidize and remove the carbonaceous or organic material and thus reactivate the catalyst. The flow of air is then interrupted, the catalyst chamber is swept free of air with steam, e.g. by feeding superheated steam alone to the bed for from about 45 seconds to 2 minutes, and introduction of the olefin-containing starting material in admixture with steam is resumed. Commercial practice is to group the reactors in pairs which are operated in a one-on, one-off fashion with the "off" reactor being regenerated.

The above-described operations of purging the catalyst bed by passing superheated steam through the bed, then passing the reaction mixture of steam and the olefin-containing hydrocarbon through the bed, next regenerating the catalyst by passing a mixture of steam and air or oxygen through the bed, and again purging the bed with steam alone, constitutes an operating cycle of the process. This cycle is repeated many times over, usually with little or no change in procedure from one cycle to the next, except that the dehydrogenation temperature is very gradually raised over a period of months, because of the normally very gradual decrease in activity of the catalyst, to maintain the olefin conversion values of from about 30 to 35 per cent per pass. With good luck and when operating in the manner just described, a bed of the catalyst should have a useful life of from 6 to 9 months (equivalent to 600 – 650 lbs. of butadiene per pound of catalyst) of continuous service, during most of which time the selectivity demonstrated by the catalyst decreases only gradually and remains in the vicinity of about 90 percent. Unfortunately, experience has been that after a bed of catalyst has produced anywhere up to about 150 to 250 lbs. of butadiene per pound of catalyst, there is a sharp and spontaneous rise in the proportion of carbon dioxide in the effluent gases and carbon mounds form in the bed and render the catalyst unsuitable for further use, unless removed from the reactor and the material of the carbon mounds removed by screening. This occurrence is accompanied by further decreases in the activity and the selectivity of the catalyst.

In accordance with the present invention, the decomposition of the feed stream forming carbon dioxide and the formation of carbon mounds which arise in the course of the dehydrogenation process described hereinabove can be completely eliminated by continuously or intermittently introducing into the reaction zone a sulfur-containing material characterized by the empirical formula:

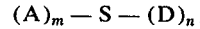

$$(A)_m - S - (D)_n$$

as defined above.

Illustrative of such sulfur-containing materials are hydrogen sulfide (preferred), organomercaptans such as the alkyl mercaptans as, for example, ethyl mercaptan, propyl mercaptan, n-butyl mercaptan, octyl mercaptan, isobutyl mercaptan, hexyl mercaptan and the like; the aryl mercaptans such as phenyl mercaptan, napthyl mercaptan and the like; the organosulfides such as methylthioethane, phenylthioethane, carbon bisulfide and the like; the organosulfoxides such as dimethyl sulfoxide, methyl sulfonyl ethane and the like; the organosulfones such as diethyl sulfone, methyl sulfonyl ethane, and phenyl sulfonyl ethane and the like.

The manner of adding the sulfur-containing material is not considered critical except that the entire catalyst bed should be exposed to the sulfur-containing material at least periodically while the hydrocarbon feed is being passed through it. Such composition can be added to either the steam or olefin streams prior to their admixture or after admixture. In addition, the sulfur-containing material can be added directly to the reaction zone. Such addition can be conducted on a continuous or intermittent basis, although continuous addition is preferred. It can be added throughout both the dehydrogenation and regeneration phases of each operating cycle or it can be added to the olefin reactant so as to enter the reactor only during the dehydrogenation phase of the cycle. If added to the steam, it is preferred to add it continuously. Most conveniently, the latter can be accomplished by adding said composition to the water supplied to the steam generator and thereby introducing it to the feed stream through the steam.

As has been indicated above, it has been found in the present invention that the addition of the sulfur-containing material on either a continuous or intermittent basis (i.e. "intermittent" meaning a repeated addition at intervals during addition of the hydrocarbon feed) has essentially no adverse effect on the catalyst and thus can be added to dehydrogenation reactors without regard to the prior operating history of the catalyst being employed. In this manner, the addition of said composition serves to check or retard or inhibit the tendency of even fresh as well as used catalysts to deteriorate upon repeated cycling thereby increasing effective catalyst life and maintaining maximum activity as evidenced by conversion and selectivity.

The calcium/nickel phosphate catalysts usually require a break-in period lasting anywhere up to about the first 75 hours of use. During this break-in period, their performance may be variable or be changing, but they usually are relatively free of the formation of carbon mounds during this period.

For safety sake, in case of a particularly "wild" lot of catalyst, it is recommended that a very small proportion (i.e. in the neighborhood of about 5 ppm by weight on the total feed) of the sulfur-containing material be added during the break-in period while carefully monitoring the carbon dioxide content of the gases leaving the bed. At the first onset of an increase in such carbon dioxide content, the proportion of the sulfur-containing additive should be increased immediately to the range of about 8 to about 18 ppm on the total feed. The latter level will cause the $CO_2$ level to drop to very low levels and completely inactivate any carbon mounds then present in the bed. One the desired lowest carbon dioxide level is reestablished the proportion of sulfur-containing material can be cut back gradually to a minimum level, usually in the region of about 10 ppm on the total feed.

A catalyst which has once been subjected to sulfur treatment according to the present process must continue to receive the treatment. If the treatment ceases for more than several cycles of the process (as described above), as when the feed of the sulfur composition fails for undetected mechanical reasons, the onset of carbon mound formation will be quite rapid and spontaneous and the $CO_2$ content of the effluent gases will rise rapidly and precipitately. When the latter occurs, resumption of feed of the sulfur composition at moderately increased concentration in the range of 10 to 25 ppm on the total feed will very quickly extinguish the carbon mound or mounds responsible for the decomposition and the $CO_2$ concentration in the reactor effluent will quickly return to normal, low levels.

When a charge of catalyst which has generated a carbon mound and then given the sulfur treatment as described just above is examined, the catalyst bed in the region of the former carbon mounds will be found to have been converted to an ash-like material. However, since formation of a carbon mound results in permanent loss of at least a portion of the expensive catalyst, it is recommended that the sulfur-containing additive be added throughout the full life of the charge, preferably during the olefin feed "on" portion only of the cycle, in order to completely eliminate any possibility of carbon mound formation. When such a procedure is followed, the life of a catalyst charge will be in the range of 600 to 700 lbs. of butadiene/lb. of catalyst and there will be no shut-downs for screening of the catalyst.

The following examples are for illustrative purposes only and are not to be construed as limiting the scope of the present invention.

EXAMPLES

Example 1

Through a bed of freshly prepared granular dehydrogenation catalyst consisting essentially of an intimate mixture of about 2 percent by weight of chromium oxide and 98 percent of calcium nickel phosphate containing an average of 8.5 atoms of calcium per atom of nickel was passed a mixture of steam and air at a rate corresponding to 700 liters of air expressed at 0°C and 760 millimeters absolute pressure per liter of catalyst bed. The steam and air mixture was passed through the catalyst bed at approximately 700°C for 10 minutes, thereafter the catalyst pellets were crushed to 10 to 20 mesh and 10 milliliters thereof were loaded into a ¾ inch ID stainless steel reactor. The reactor was flushed with steam to remove air after which a vaporous mixture of normal butene (1-butene and 2-butene free of sulfur) and about 16.7 parts/vol. of steam per vol. of butene were passed through the catalyst bed at a temperature of about 700°C. for 10 minutes. Thereafter the flow of butenes was stopped and steam alone was passed through the bed for 2 minutes. Air was then admixed with the in-flowing steam and passed into the catalyst bed at a rate corresponding to 700 liters of air expressed at 0°C. and 760 millimeters absolute pressure per liter of the catalyst bed per hour. The steam and air mixture was passed through the catalyst bed at about 700°C for 10 minutes, air was then flushed from the bed by passing steam alone into the bed for 2 minutes. The vapors flowing from the reactor were cooled sufficiently to condense the steam. The hydrocarbons were collected and analyzed to determine the amounts of unconsumed normal butenes and of 1,3-butadiene therein. The procedure was then repeated using a 25 minute reaction cycle. Table I below summarizes the results obtained for both cycles:

TABLE I

| Time of Reaction Cycle Minutes | Conversion Mole % | Selectivity Mole % to | | $H_2/C_4H_6$ |
|---|---|---|---|---|
| | | $C_4H_6$ | $CO-CO_2$ | |
| 10 | 76.8 | 74.9 | 10 | 2.5 |
| 25 | 60.5 | 55.7 | 26.5 | 5.4 |

Example II

A sample of catalyst pellets from a carbon mound which showed spots of coke on their outside wall but contained a carbon core was treated and tested under the same conditions as described in Example I. Table II below shows the results obtained by dehydrogenation of butenes in the presence of said catalyst.

TABLE II

| Time of Reaction Cycle Minutes | Conversion Mole % | Mole % to C$_4$H$_6$ | CO-CO$_2$ | H$_2$/ C$_4$H$_6$ |
|---|---|---|---|---|
| 10 | 78.6 | 32.3 | 55.2 | 16.7 |
| 25 | 75.1 | 16.1 | 70.1 | 39.8 |

The catalyst pellets taken from the carbon mound result in a large amount of coke formation and substantially reduced yields of butadiene-1,3. The major products from this catalyst were carbon dioxide, carbon monoxide, and lighter hydrocarbons. It should be noted that even though carried out at a temperature about 100°C. lower than that employed in Example 1, the proportion of CO/CO$_2$ is from 3 to 5 times higher showing the exceedingly deleterious nature of catalyst which has become "wild" and formed carbon mounds.

Example III

An additional sample of pellets from the carbon mound as used in Example II was placed in the reactor and treated and tested under the relatively more severe conditions as described in Example I, except that varying amounts of hydrogen sulfide were added to the water being supplied to the steam generator. The butene employed was sulfur-free. The results obtained are shown in Table III below.

TABLE III

| H$_2$S Conc. PPM (a) | Time of Reaction Cycle Minutes | Conversion Mole % | Selectivity Mole % to C$_4$H$_6$ | CO-CO$_2$ | H$_2$/ C$_4$H$_6$ |
|---|---|---|---|---|---|
| 384 | 10 | 77.4 | 31.6 | 52.8 | 15.9 |
|  | 25 | 66.2 | 36.9 | 43.6 | 10.9 |
| 785 | 10 | 70.0 | 56.5 | 25.9 | 5.4 |
|  | 25 | 54.7 | 66.5 | 6.0 | 2.0 |
| 1954 | 10 | 75.5 | 77.1 | 9.0 | 2.7 |
|  | 25 | 59.7 | 75.3 | 6.2 | 2.0 |
| 3840 | 10 | 78.0 | 77.7 | 5.8 | 2.3 |
|  | 25 | 63.9 | 73.2 | 3.7 | 1.7 |

(a) based on butene

The addition of hydrogen sulfide to the catalyst bed exhibits a marked effect on the catalyst sample. Hydrogenolysis or the "wild" activity of the catalyst is dramatically reduced. While the proportions of H$_2$S employed in Example III were higher than required, the experiments amply demonstrate that addition of the sulfur-containing material did not interfere with dehydrogenation.

Example IV

An additional sample of pellets from the carbon mound as used in Example II was placed in the reactor and treated as in Example I except that 2,500 parts per million n-butyl mercaptan based on butene (again sulfur-free) was employed in place of hydrogen sulfide. The results obtained are shown in Table IV below.

TABLE IV

| Time of Reaction Cycle Minutes | Conversion Mole % | Mole % to C$_4$H$_6$ | CO-CO$_2$ | H$_2$/ C$_4$H$_6$ |
|---|---|---|---|---|
| 10 | 76 | 74 | — | 2.7 |
| 25 | 60 | 70 | — | 2.0 |

While the proportion of the sulfur-containing material was higher than needed, the experiment shows that the "wildness" of the catalyst was suppressed (see especially the H$_2$:C$_4$H$_6$ ratio).

Example V

In a large commercial plant, the procedure for the practice of the method of this invention will be described herein and the summary of results given below. The reactors in this plant are operated with the temperature of the mixture (16 or 17 volumes of steam for every 1 volume of n-butene) at about 1,230°F (Ca 666°C) with 39 to 41 percent of the feed converted at a selectivity in the range of 88 to 92 percent to butadiene-1,3. The sulfur content of the total feed (olefin + steam), except for the H$_2$S added, would have been about 1 ppm. When each new charge of calcium nickel phosphate catalyst is charged to a reactor, the addition of hydrogen sulfide directly to the butene feed line before the preheaters at abut 5 ppm on the total feed is begun as soon as the reactor is up to operating conditions. The latter rate is maintained throughout the life of the charge unless the recording CO$_2$ meter indicates an increasing CO$_2$ level in the gases leaving the reactor. When the first sign of the latter occurs, the rate of hydrogen sulfide addition is increased for a time to about 18 ppm. on the total feed. When the CO$_2$ meter indicates that the CO$_2$ level has returned to normal, (the carbon mound formation is controlled) the rate of addition of hydrogen sulfide is decreased slowly until a minimum rate without carbon mound formation is established. Usually, the latter minimum rate is between about 5 and about 12 ppm on the total feed. Seemingly some catalyst charges are less "wild" than others and require a lower level of hydrogen sulfide addition for stable, long-continued addition. It was found desirable, whenever the injection of hydrogen sulfide was interrupted unexpectedly for any reason, to cut off the hydrocarbon feed until the flow of hydrogen sulfide is restored.

With this procedure established throughout the plant, there is a most significant reduction in catalyst usage and a drastically-reduced number of days of down time. Data on the operation for the three preceding years without the sulfur compound addition, and an average thereof is given below as a basis of comparison for the results of one full year of operation according to the above-described procedure of this invention:

| Year | Catalyst Changes | Number of Screenings | Days/Year Down Time |
|---|---|---|---|
| Year-3 | 16 | 21 |  |
| Year-2 | 14 | 37 |  |
| Year-1 | 11 | 43 |  |
| 3-Yr.Aver. | 14 | 37 | 170 |
| Year With H$_2$S Addition | 9 | 2* | 44 |
| Difference: per Year Aver. | 5 | 35 | 126 |

*Both of these screenings were necessitated for reasons other than carbon mound formation The above data are a most outstanding demonstration of the improvement brought about by the injection of a sulfur-containing material according to this invention. Catalysts costs (including maintenance costs associated with the catalyst) are reduced considerably more than 50 percent. During the full year of operation many of the catalyst charges yielded up to 650 lbs. of butadiene/lb. of catalyst and the average of all charges completing their useful life during the test year was 580 lbs./lb. The latter figure was low because some of the charges reaching the end of their useful life during the year had operated for an appreciable portion of that life in the prior year without the sulfur-containing additive. When a comparable period has elapsed when all catalyst charges are continuously treated with a sulfur-containing additive such as $H_2S$ from the inception of their service, it is expected that the average life of all charges would be above 600 lbs./lb.

Example VI

In this example, a pair of large commercial dehydrogenation reactors containing commercial "Dow B" calcium nickel phosphate (Dow Corporation, Midland, Michigan) is operated to oxydehydrogenate butenes to butadiene-1,3, as described above. The operation is started up with a feed consisting of commercial mixed butenes (containing other olefins and other hydrocarbons and about 5 ppm by weight of total sulfur ), steam and oxygen as specified above. After several days of cyclic operation, the proportion of $CO_2$ in the effluent gases is noted to be increasing. The reactors are then shut down, opened and the catalyst examined for carbon mounds. None are found so the reactors are again placed in operation. After several more days of operation, the $CO_2$ level in the reactor effluent is again observed to be increasing above acceptable limits. At the latter point feed of $H_2S$ is begun to the butene feed preheater so as to constitute between about 5 and about 15 ppm (by wt.) on the total feed (butene, oxygen and steam). In a relatively short interval of a few cycles, the $CO_2$ level in the gases leaving the reactor is observed to be decreasing and returns to the normal, original levels with continuous $H_2S$ feed to the butene preheater. The reactors are operated in the latter fashion with $H_2S$ feed for a total of about 6 months during which time no difficulties with high $CO_2$ levels in the effluent gases or carbon mounds are observed.

We claim:

1. In a process for the catalytic dehydrogenation of olefins to diolefins by passing an olefin into contact with a calcium nickel phosphate catalyst at a temperature from about 450°C. to about 750°C, the improvement which comprises feeding to said catalyst along with said olefin from about 30 to about 250 parts/wt., per million parts/wt. of said olefin, of a sulfur-containing material characterized by the formula:

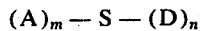

wherein (A) is selected from the group consisting of a hydrogen atom, an oxygen atom, and alkyl and aryl hydrocarbon radicals containing from one to about 20 carbon atoms; (D) is selected from the group consisting of a hydrogen atom and alkyl and aryl hydrocarbon radicals containing from one to about 20 carbon atoms; and $m$ and $n$ are integers which can be the same or different and range from 1 to 2.

2. In a process for the catalytic dehydrogenation of an olefin to a diolefin by passing the mixed vapors of an olefin and steam into contact with a calcium nickel phosphate catalyst at a temperature of from about 550°C. to about 750°C., the improvement which comprises intermingling with said mixed vapors before contact with said catalyst from about 4.5 to about 50 parts/wt. per million parts/wt. of the total of said mixed vapors, of a sulfur containing material characterized by the formula:

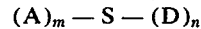

where (A) is selected from the group consisting of a hydrogen atom, an oxygen atom, and alkyl and aryl hydrocarbon radicals containing from one to about 20 carbon atoms; (D) is selected from the group consisting of a hydrogen atom and alkyl and aryl hydrocarbon radicals containing from one to about 20 carbon atoms; and $m$ and $n$ are integers which can be the same or different and range from 1 to 2.

3. The method as defined in claim 2 wherein the said sulfur-containing composition is hydrogen sulfide added as a vapor in a proportion of from about 5 to about 25 parts/wt. per million parts/wt. of said total mixed vapors.

4. The method as defined in claim 2 wherein the said olefin is a butene, the steam is present in proportions of from about 15 and about 20 volumes per volume of butene, and the said sulfur-containing composition is hydrogen sulfide which is added in the proportion of from about 5 and about 25 ppm based on the total weight of said mixed vapors.

5. Process as claimed in claim 2 wherein the said sulfur-containing composition is an organomercaptan.

6. A process for catalytically oxydehydrogenating olefins containing from four to six carbon atoms to diolefins comprising forming a mixture of the vapors of an olefin of said class and steam in steam:olefin volume ratio of 15:1 to 20:1, from about 4,200 to about 29,000 parts/wt. of oxygen per million parts/wt. of the total of said mixed vapors, and from about 5 to about 25 parts/wt. per million parts/wt. of the total of said mixed vapors, of a sulfur-containing compound characterized by the formula:

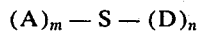

wherein A is selected from the group consisting of hydrogen atoms, oxygen atoms, and alkyl and aryl hydrocarbon radicals containing from one to about 20 carbon atoms; (D) is selected from the group consisting of hydrogen atoms and alkyl and aryl hydrocarbon radicals containing one to about 20 carbon atoms; and $m$ and $n$ are integers which may be the same or different and range from 1 to 2, passing the resulting mixture f vapors through a bed of a calcium nickel phosphate dehydrogenation catalyst at a temperature from about 450° to 700°C, and recovering the diolefins formed from the vapors issuing from said bed.

7. The method as defined in claim 6 and further characterized by said olefin being a butene and said sulfur containing composition being hydrogen sulfide, the latter being added continuously to the incoming butene feed stream.

8. In a process for catalytically dehydrogenating butenes to produce butadiene-1,3 over a calcium nickel phosphate dehydrogenation catalyst at a temperature between about 450°C. to about 750°C., the improvement which comprises feeding to such catalyst along with a mixed butene feed containing between about 15 and about 20 volumes of steam per volume of said butene feed and from about 5 to abut 25 parts/wt., per million parts by weight total of said mixed feed, of a sulfur-containing material characterized by the formula:

$$(A)_m - S - (D)_n$$

wherein (A) is selected from the group consisting of a hydrogen atom, a carbon atom, an oxygen atom, and alkyl and aryl hydrocarbon radicals containing from one to about 20 carbon atoms; (D) is selected from the class consisting of a hydrogen atom and alkyl and aryl hydrocarbon radicals containing from one to about 20 carbon atoms, and $m$ and $n$ are integers which may be the same or different and range from 1 to 2, and maintaining feed of said sulfur-containing material to the catalyst during addition of olefin throughout the useful life of said catalyst.

* * * * *

UNITED STATES PATENT OFFICE
CERTIFICATE OF CORRECTION

Patent No. 3708550  Dated January 2, 1973

Inventor(s) HAROLD BEUTHER; HAROLD E. SWIFT

It is certified that error appears in the above-identified patent and that said Letters Patent are hereby corrected as shown below:

Col. 1, line 43, "or" should read --of--.

Col. 5, lines 49 and 50, "and usually for from about $51\frac{1}{2}2$" should read --and usually for from about $5\frac{1}{2}$--.

Col. 7, line 36, "One" should read --Once--.

Col. 8, lines 38 and 40 should continue as one sentence; Line 40 cancel "Minutes" and "Mole%"

Col. 13, line 5, "abut" should read "about".

Signed and sealed this 1st day of January 1974.

(SEAL)
Attest:

EDWARD M. FLETCHER, JR.
Attesting Officer

RENE D. TEGTMEYER
Acting Commissioner of Patents